United States Patent [19]
Anderson et al.

[11] 3,738,011
[45] June 12, 1973

[54] THICKNESS-SCRATCH TESTING DEVICE

[75] Inventors: Elizabeth Anderson, Washington, D.C.; Richard E. Brown, Silver Spring, Md.

[73] Assignee: The United States of America as represented by the Secretary of the Army, Washington, D.C.

[22] Filed: Aug. 23, 1971

[21] Appl. No.: 174,079

[52] U.S. Cl. .............................................. 33/169 F
[51] Int. Cl. ............................................. G01b 5/06
[58] Field of Search .................................... 33/169 F

[56] References Cited
UNITED STATES PATENTS

| | | | |
|---|---|---|---|
| 2,546,990 | 4/1951 | Euverard et al. | 33/169 F UX |
| 2,814,122 | 11/1957 | Euverard | 33/169 F |

Primary Examiner—Robert B. Hull
Attorney—Harry M. Saragovitz, Edward J. Kelly, Herbert Berl et al.

[57] ABSTRACT

A machine for testing the thickness of a coating on an object having a curved surface at one or more predetermined locations, comprising means to support the object with the coating in a predetermined position, means for supporting a scratch film gage comprising a disc having an extended axial thickness and a circular saw mounted eccentrically of the disc with the teeth of the saw extending at different depths from the edge of the disc, said means allowing the position of the gage to be adjusted to expose different depths of the saw teeth against the surface, means to adjust the position of the disc to permit the edge to engage the curved surface of the object, means to force the gage against the surface with a predetermined force, and means to relatively rotate the curved surface and the gage about the axis of the surface in a predetermined path.

10 Claims, 3 Drawing Figures

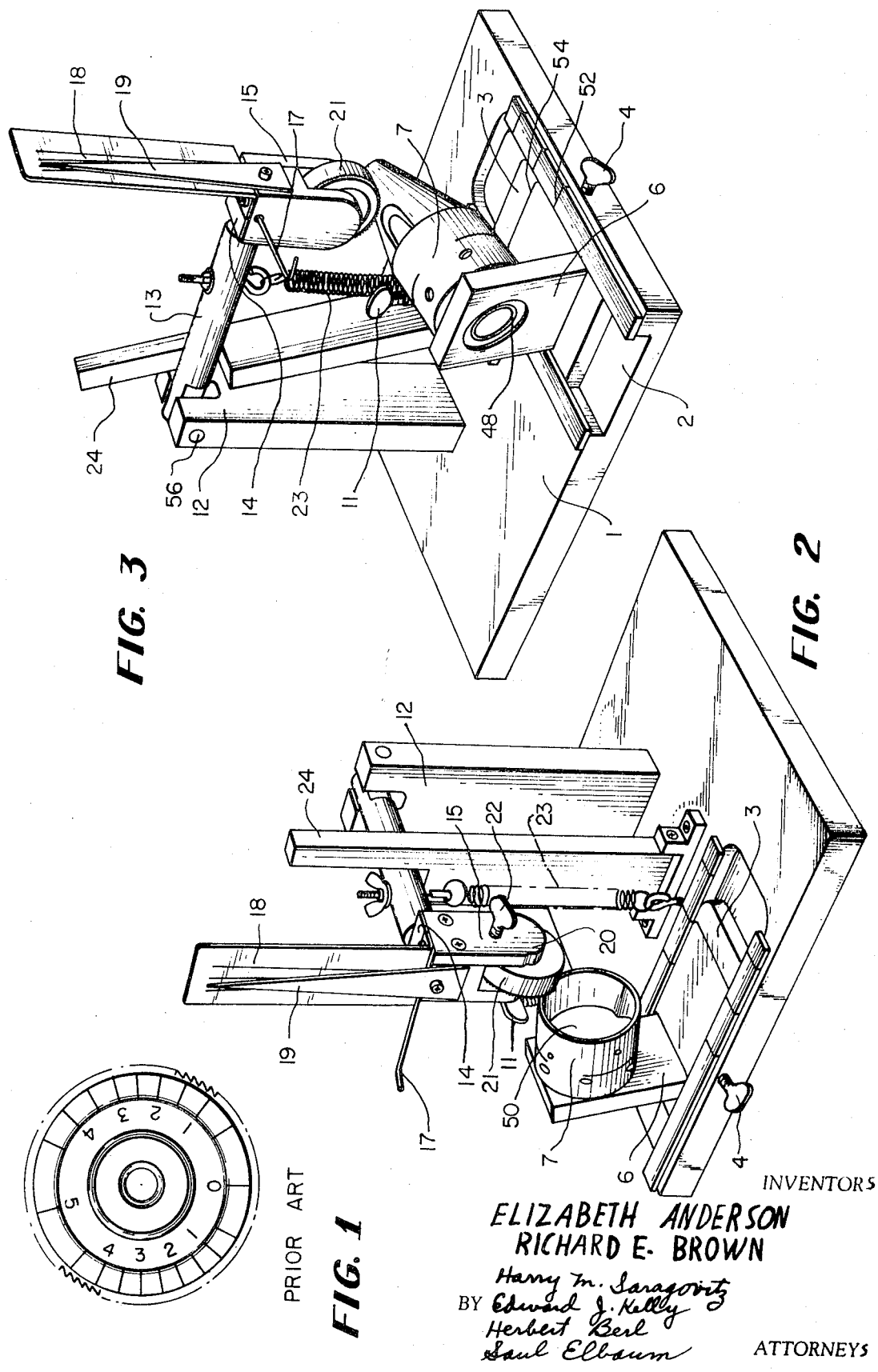

THICKNESS-SCRATCH TESTING DEVICE

The invention described herein may be manufactured, used, and licensed by and for the United States Government for governmental purposes without the payment to us of any royalty thereon.

BACKGROUND OF THE INVENTION

This invention relates to the construction of a machine which will permit the testing of the thickness of a coating upon the surface of an object, particularly an object having the coating on a surface of revolution, in an accurate and rapid manner. While the prior art has employed tools and machines for the determination of the thickness of coatings, the prior art devices, known to the inventors, were not adapted to permit rapid and sequential testing of a plurality of objects when the objects had curved surfaces.

The present invention is especially adapted to serve as a quality control in the coating of a number of nose cones. The conical configuration of the nose cone, makes it difficult to apply a coating of uniform thickness at all points on the cone. If the thickness of the coating is determined at a single point of a nose cone, or at different points on the surfaces of a series of nose cones, a true picture of the character of the coating being applied will not be obtained. The present invention permits a series of identical tests to be applied at different points on the same nose cone and to corresponding points on each of a series of nose cones.

The present invention utilizes a thickness gage, such as the Gardner Scratch Thickness Gage, for measuring the thickness of a dried film or coating on a curved or irregular surface. The conventional Gardner Scratch Thickness Gage is designed for the rapid measurement of the thickness of dry coatings on any non-deformed base by utilizing the pressure required to scratch through the coating. Measurements may be made on the edges or on simple curved surfaces, such as those of pipes, provided the gage is drawn in the direction of curvature. The conventional Gardner Scratch Thickness Film Gage, as illustrated in FIG. 1, consists of a circular metal slitting saw mounted eccentrically on a stainless steel disc of one-half inch thickness and of slightly smaller diameter than the saw. The saw is 1.75 inches in diameter, 0.02 inch thick and has 90 cutting teeth. At one radius, the saw and the disc are tangent, and at the opposite radius the saw extends beyond the disc to a maximum. A scale graduated from 0 to 5 mils is located on the saw side of the gage. Measurements made with the hand-held gage are reproducible to approximately one-fourth mil.

The Gardner Scratch Thickness Gage has found its most useful application as a "go no go" gage in determining whether a minimum specification coating has been applied to a given substrate. For this purpose the gage can be considered non-destructive since the tooth representing the minimum specified thickness will not cut through the coating.

Visual observation only is normally used to evaluate the scratch made in the coating by the gage. Where multiple coats of different colored material have been applied, it is also possible to determine the thickness of each coat. It is also easy to observe when the gage has cut through a coating applied to wood, plastic, glass, etc., especially if the base is of a different color from the applied coating.

While the Gardner Scratch Film Thickness Gage can provide good results in the hands of a skilled operator, it is not as satisfactory when used by unskilled employees. It is also limited in use to the testing of coatings on flat surfaces and on surfaces which are simple curves as found on pipes. The present invention is designed to provide a unique machine which will give satisfactory results, which can be readily reproduced by unskilled operator, even when used on surfaces which are not simple curves, such as the conical surfaces of a nose cone, and which can be used to test coatings which are extremely hard or tough.

While it is recognized that various forms of thickness gages have been employed which include stands or supports to hold the gage relative to the work while being tested, such as the Gardner Thickness Gage Stand for the Gardner Penetrating Needle and the Princeton Adhesion and Scratch Tester, and The Arco Microknife, these devices do not meet the need for a reliable means to support the Gardner Scratch Thickness Gage. The successful use of the Gardner Scratch Film Thickness Gage requires that the disc be set firmly on the curved surface and the gage be moved relatively to direction of curvature of curved surface with fixed pressure in a fixed pattern and of a reproducible path.

OBJECTS OF THE INVENTION

Accordingly, it is a primary object of this invention to provide a means to support and to rotate an object having a curved surface about the axis of curvature of the surface while in contact with a scratch thickness film gage.

An important further object of this invention is to provide a means to support a scratch thickness film gage comprising a disc and a circular metal slitting saw mounted eccentrically of the disc, with a predetermined depth of the teeth of the saw exposed adjacent the surface to be tested.

It is also an object of the present invention to provide means to support a scratch thickness film gage comprising a circular disc of substantial thickness, so that the disc can be adjusted to contact the curved surface with the axis of the disc substantially parallel to the axis of curvature of the surface.

A still further object of the invention is to provide means to support an article to be tested so that the scratch film thickness gage can successively test a plurality of locations on said article.

BRIEF SUMMARY OF THE INVENTION

Briefly, the thickness scratch testing device of this invention comprises a scratch thickness gage element comprising a disc of substantial thickness having an extended flat edge parallel to the axis of the disc and a circular metal slitting saw mounted eccentrically of said disc and being of slightly larger diameter than the disc. The peripheries of the saw and the disc are tangent at one point with the teeth of the saw being exposed to different depths elsewhere around the periphery. There is also included a means for mounting the gage element to be selectively rotatable about the axis of the disc to position different portions of the saw adjacent the article to be tested; a means for supporting the mounting means for the gage element to permit the flat edge to contact the surface of the article to be tested; means to mount the supporting means to allow the gage element to be tested; means to apply a biasing force to hold the gage element against the surface of the article; means to secure the article to be tested in relatively fixed adjustable position; and means to move the surface of the article and the gage element relatively to scratch the surface of the article by the teeth of the saw of the gage element.

The invention will be better understood and objects other than those set forth above will become apparent, when consideration is given to the following detailed description. Such description makes reference to the annexed drawings presenting preferred illustrative embodiments of the invention, and wherein:

FIG. 1 illustrates the conventional Gardner Scratch Thickness Gage used in the practice of this invention;

FIG. 2 is a partially fragmentary perspective view of an embodiment of this invention utilizing a Gardner Scratch Thickness Gage illustrated in FIG. 1; and FIG. 3 is a perspective view of another embodiment of this invention showing a work piece in operative engagement with the device of this invention.

DETAILED DESCRIPTION OF THE INVENTION

Referring now more specifically to FIGS. 2 and 3, the machine has a base element 1 which serves as means to provide the necessary spacial cooperation between the movement of the other parts. The base 1 provides a general support for the means to support and to rotate the object to be tested. This means includes a guideway 2 on the base 1. This may be a groove in the surface of the base or separate tracks mounted on the base. A slide 3 is shaped to correspond with the shape of the guideway 2 and is arranged to be movable lengthwise of the guideway. Along the side or sides of the guide 2 are engraved indices 52 at intervals with a corresponding index 54 provided on the slide 3. The slide may be locked in position in the guide by the set screw 4. The slide carries a support bracket 6. In the specific embodiment shown this support 6 is arranged at an angle to the vertical. It is contemplated that the vertical angle of the support bracket 6 with respect to the slide may be made adjustable in order to accommodate different shaped articles, and that the bracket 6 may be pivoted about the vertical axis for allowance for other adjustment. The support bracket 6 carries a chuck 7 to receive the article to be tested. The chuck 7 includes a rotary mounting means 48 which permits the article to be tested to be rotated with respect to the base. In the form shown the chuck 7 has a cylindrical opening 50 to receive the cylindrical portion of a conical nose cone as illustrated in FIG. 2. The means 11 are means to secure the end of the cone in position in the chuck 7. Any chuck which will fit the article being tested can be substituted for the specific form of the chuck shown. The means thus far described provide means for securing the article to be tested in one of a plurality of positions along the length of the guideway and means to adjust the angle of the surface relative to the base and to rotate the article.

The base 1 is also provided with a standard 12 extending vertically from a position near the guideway. An arm 13 extends from the standard in the direction towards the guideway. The arm is pivoted to the standard to be movable towards and away from the guideway and article. While a simple pivot connection 56 is illustrated, the arm may be mounted to slide vertically on the standard. The arm can also be pivoted to a member which is slideable on the standard. Either of these constructions will permit the machine to be used to test a variety of articles of different sizes and shapes.

The arm 13 terminates at a position approximately above the guideway 2. The end of the arm 13 above the guideway is provided with a swivel joint 14. The joint 14 connects the mounting means 15 with arm 13, and permits the mounting means to be disposed in a plurality of different positions. This mounting means is purposefully set off-center so that the center of gravity of the head falls on the supporting disc and within one-fourth inch of the slitting saw of the gage 21, rather than on the center or outer diameter of the supporting disc. This ensures that the teeth can scratch beyond the supporting disc, as calibrated by Gardner. The joint can be rendered immobile by the locking means 17. An indicator plate 18 is supported by the mounting means 15 and moves with it. A pointer 19 is secured to the arm 13 and cooperates with the indicator plate 18 to give a visual indication of the relative positions of the parts. The plate 18 may be marked to indicate definite degrees of inclination.

The machine is further provided with means to apply a constant biasing force to the arm. This may be the spring 23 permit the ready introduction of the article into the chuck and the adjustment of the gage, the machine is provided with means to hold the arm 13 in operative position, thereby preventing the spring from pulling the arm towards the base. According to a preferred embodiment of this invention, this means can be a lever 24 pivoted to the base which may be moved into position between the arm and the base. Instead of using spring 23, a weight or fluid plunger can also be used to apply the pressure to the arm.

The mounting means 13 is bifurcated to provide a forked structure to receive a Gardner Scratch Film Thickness Gage 21 and more clearly illustrated in FIG. 1. The gage 21 is apertured on the center of the disc to allow rotation on the shaft 20 which passes through the gage and the bifurcated portion of the mounting means 13. A set screw 22 in the mounting means permits the gage to be rotated on the shaft 20 and to be locked in a selected position. This permits the gage to be rotated until a tooth of the desired exposure is directly above the article to be tested.

The machine is used by first placing the coated article, which will in this example be assumed to be a coated nose cone having a cylindrical body and a conical end having an ogive surface, in the chuck 7 and securing it in position by the clamping means 11. The slide 3 is then moved along the guideway 2 until the desired portion of the nose cone is adjacent the gage. At this time the gage will be held away from the nose cone by the lever 24. The set screw 22 will be loosened and the gage 21 turned so that the portion of the gage in which the disc and saw edge are tangent is nearest the nose cone and the set screw 22 tightened to secure the gage in this position. The lever 24 is moved to allow the gage to contact the surface of the nose cone. The locking means 17 on the swivel joint is then loosened and the gage moved so that the disc makes full contact with the ogive surface, and the locking means 17 is retightened. The lever 24 is moved to lift the gage from the surface. The set screw 22 is loosened and the gage is turned to bring the desired length of tooth nearest the ogive surface, and the set screw retightened. The lever 24 is operated to lower the gage into contact with the surface and to hold the gage in contact with the surface by the force exerted by the spring 23. The nose cone is then rotated with the chuck for a short distance to allow the tooth to scratch the coating. The depth of the scratch is then observed. The gage is then lifted from the surface by lever 24.

If a further test of the coating at this point is desired, the gage is then rotated in the mounting and the test repeated, with this operation being repeated at the same point until the depth is determined. The lever 24 can be operated in order to remove the gage from the article and the slide 3 moved to bring another portion of the nose cone into test position. The test can be repeated at this second position in the same manner described hereinbefore. It should be noted that the gage 21 is to be held away from the article except when setting the position of the gage and when actually testing the article.

Since the force exerted by the gage on the article is constant and the gage is held in fixed position by the various adjustments, while the surface is moved against the gage, the tests can be made rapidly and with complete accuracy.

In a preferred embodiment illustrated in the drawing, the bifurcate mounting means and the set screw constitute means for mounting the gage element in order to permit the element to be selectively rotated about the axis of the gage to expose different portions of the saw in the area to be tested. The swivel joint 14 provides means for supporting the mounting means 15 for the gage to permit the flat surface of the edge of the disc to contact the surface of the cone. The pivoted joint of the arm 13 with the standard 12 constitutes means to mount the supporting arm to be movable towards and away from the surface to be tested. The spring 23 constitutes means for applying a biasing force to hold the gage element against the surface. The guideway 2 with the slide 3 and the set screw 4 constitute means to secure the article and the gage element in relatively fixed adjustable positions. The rotary mounting of the chuck constitutes means to move the surface of the article and the gage element relatively to scratch the surface of the article by the teeth of the gage.

As a further refinement a gage having the slitting saw located between two one-fourth inch-wide supporting discs and having scale graduations across the width of the two discs, should be better suited to measurements on an ogive, or on any curved substrate, than is the present Gardner gage. This modification would facilitate the setting of the saw teeth at 90° to the substrate.

It should be understood that the invention is not limited to the exact details of construction shown and described herein for obvious modifications will occur to persons skilled in the art.

What is claimed is:

1. A scratch film thickness gage for measuring the thickness of dry coatings on the curved surface of an article, comprising
   1. a scratch thickness gage element comprising a disc of substantial thickness having an extended flat edge parallel to the axis of the disc and a circular metal slitting saw mounted eccentrically of said disc and being of slightly larger diameter than the disc, the peripheries of the saw and the disc being tangent at one point, with the teeth of the saw being exposed to different depths elsewhere around the periphery,
   2. means for mounting the gage element to be selectively rotatable about the axis of the disc to position different portions of the saw adjacent the article to be tested,
   3. means for supporting the mounting means for the gage element to permit the flat edge to contact the surface of the article to be tested,
   4. means to mount the supporting means to allow the gage element to be movable towards and away from the article to be tested,
   5. means to apply a biasing force to hold the gage element against the surface of the article,
   6. means to secure the article to be tested in relatively fixed adjustable position, and
   7. means to move the surface of the article and the gage element relatively to scratch the surface of the article by the teeth of the saw of the gage element.

2. A scratch thickness gage according to claim 1 wherein the means to secure the article comprises a chuck to hold the article.

3. A scratch thickness gage according to claim 2 wherein the chuck is rotatable and constitutes the means to move the surface and the gage element relatively.

4. A scratch thickness gage according to claim 2 wherein the chuck can be moved relatively to the gage element to permit the gage element to contact the surface at different points.

5. A scratch thickness gage according to claim 1 wherein there are means to hold the gage element away from the article.

6. A scratch thickness gage according to claim 1 wherein the means to secure the article and the gage element includes a base, a guideway on the base, a chuck, a slide mounting the chuck for movement in the guideway, a standard on the base and an arm mounted for movement relatively to the standard constituting the means to mount the supporting means to allow the gage element to be movable towards and away from the article.

7. A scratch thickness gage according to claim 6 wherein the arm is pivoted to the standard and in which the means to apply a biasing force is a spring.

8. A scratch thickness gage according to claim 7 wherein there is a pivoted lever to hold the arm and gage element selectively away from the article.

9. A scratch thickness gage according to claim 7 wherein the means for supporting the mounting means on the arm includes a swivel joint and means to lock the joint in any set position.

10. A scratch thickness gage according to claim 1 wherein the means for rotatably mounting the gage element includes a locking means.

* * * * *